United States Patent [19]
Ruehle

[11] 3,715,715
[45] Feb. 6, 1973

[54] APPARATUS FOR AND METHOD OF TREATING SEISMIC DATA TO OBTAIN A WIDE BAND REPRESENTATION

[75] Inventor: William H. Ruehle, Duncanville, Tex.

[73] Assignee: Mobil Oil Corporation

[22] Filed: Oct. 30, 1970

[21] Appl. No.: 85,630

[52] U.S. Cl...340/15.5 DP, 340/15.5 TC, 340/172.5, 234/77, 235/152
[51] Int. Cl. ............................................. G01v 1/36
[58] Field of Search.....340/15.5 DP, 15.5 TC, 172.5; 343/5 DP; 234/77 A, 77 B, 77 C, 77 G; 235/156, 152

[56] References Cited

OTHER PUBLICATIONS

Negron, "Digital 1/3 Octave Spectral Analysis", 10/66, pg. 605–614, J.A.C.M., vol 13, No. 4
George, "Application of Lisense Convolution etc", 11/62, 2313–2319 I.R.B., vol 50, Primary Examiner—Benjamin A. Borchelt
Assistant Examiner—N. Moskowitz
Attorney—William J. Scherback, Frederick E. Dumoulin and Arthur F. Zobal

[57] ABSTRACT

A computer apparatus for and computer performed method of obtaining a wide band representation of seismic reflection amplitudes. The seismic trace is successively truncated, each of the successive truncations is successively Fourier analyzed, and each center frequency component amplitude of the successive Fourier analyses is computed. The effects of successive truncation on the resulting center frequency function are then removed through the use of an optimum separation operator.

7 Claims, 3 Drawing Figures

APPARATUS FOR AND METHOD OF TREATING SEISMIC DATA TO OBTAIN A WIDE BAND REPRESENTATION

BACKGROUND OF THE INVENTION

This invention relates to treating seismograms to obtain a wide band representation of the absolute amplitude of the seismogram.

U.S. Pat. No. 3,274,542 describes a band equalization technique for seismic traces. The technique described in that patent performs a band broadening, but the technique requires the operator to have knowledge of the distortion present in the seismograms. It is desirable to have a band broadening technique which can be applied directly to the seismogram without prior knowledge, or estimation of, the distortions present in the seismogram.

SUMMARY OF THE INVENTION

In accordance with one aspect of the present invention, a method and apparatus are provided for successively truncating a seismic trace, successively Fourier analyzing the successive truncations of the seismic trace, and successively computing the center frequency component amplitudes for each of the successive Fourier analyses. A function representative of the amplitudes of the center frequency components is then obtained.

The effects of successive truncations may then be removed to produce a wide band representation of the seismic trace.

BRIEF DESCRIPTION OF THE DRAWINGS

For a more detailed explanation of the invention and the foregoing aspects as well as others, reference may be made to the following description taken in conjunction with the drawings wherein.

DESCRIPTION OF THE PREFERRED EMBODIMENT

Figure 1A:
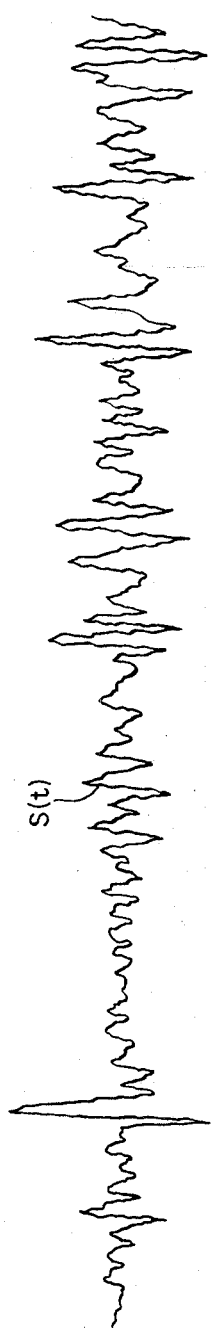
FIG. 1a is a trace of seismic reflections characteristic of a conventional seismogram.

The seismic trace $S(t)$ of FIG. 1a represents raw seismic data displayed in the form of a conventional seismogram obtained by conventional exploration techniques. FIG. 1c is a wide band representation $CFA'(t)$ of the seismic trace $S(t)$ treated by a method and apparatus embodying the invention.

Figure 1B:
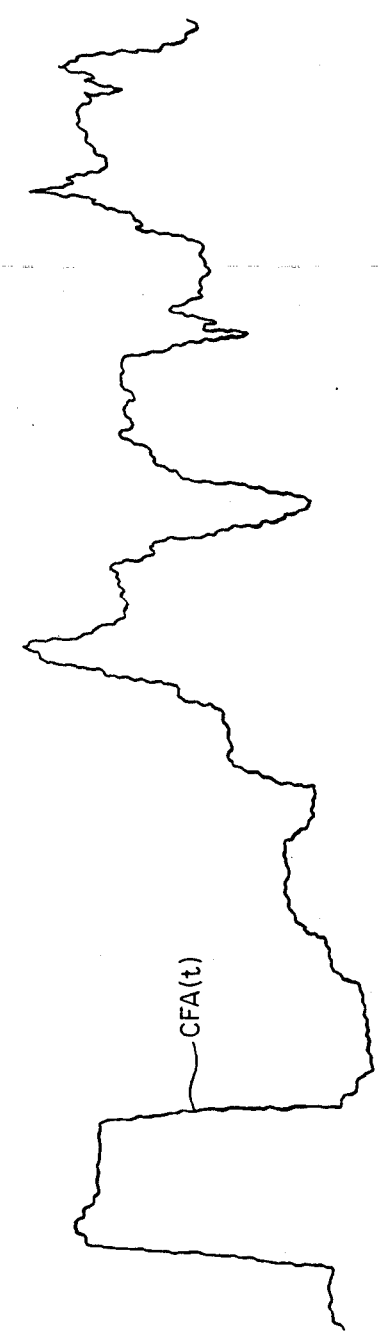
FIG. 1b is a waveform representing the amplitudes of center frequency components in successive Fourier analyses.
Figure 1C:
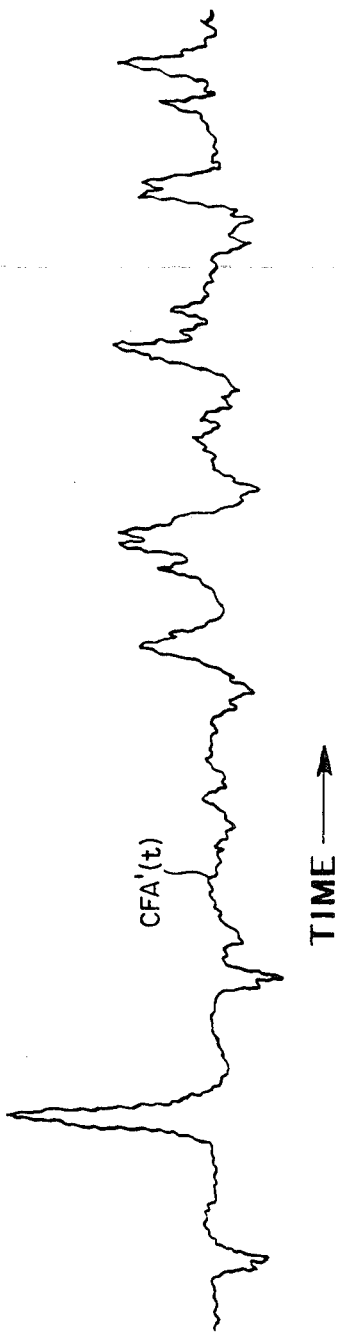
FIG. 1c is a waveform representing the amplitudes of FIG. 1b after the effects of successive truncations are removed.

FIG. 1b displays a waveform representing the function $CFA(t)$. The function $CFA(t)$ represents the amplitude of the center frequency components in each successive Fourier analysis as measured along the vertical axis corresponding to a window along the horizontal axis. Finally, the effects of successive truncations on the seismic trace $S(t)$ are removed to obtain the function $CFA'(t)$ as shown in FIG. 1c.

Figure 2:
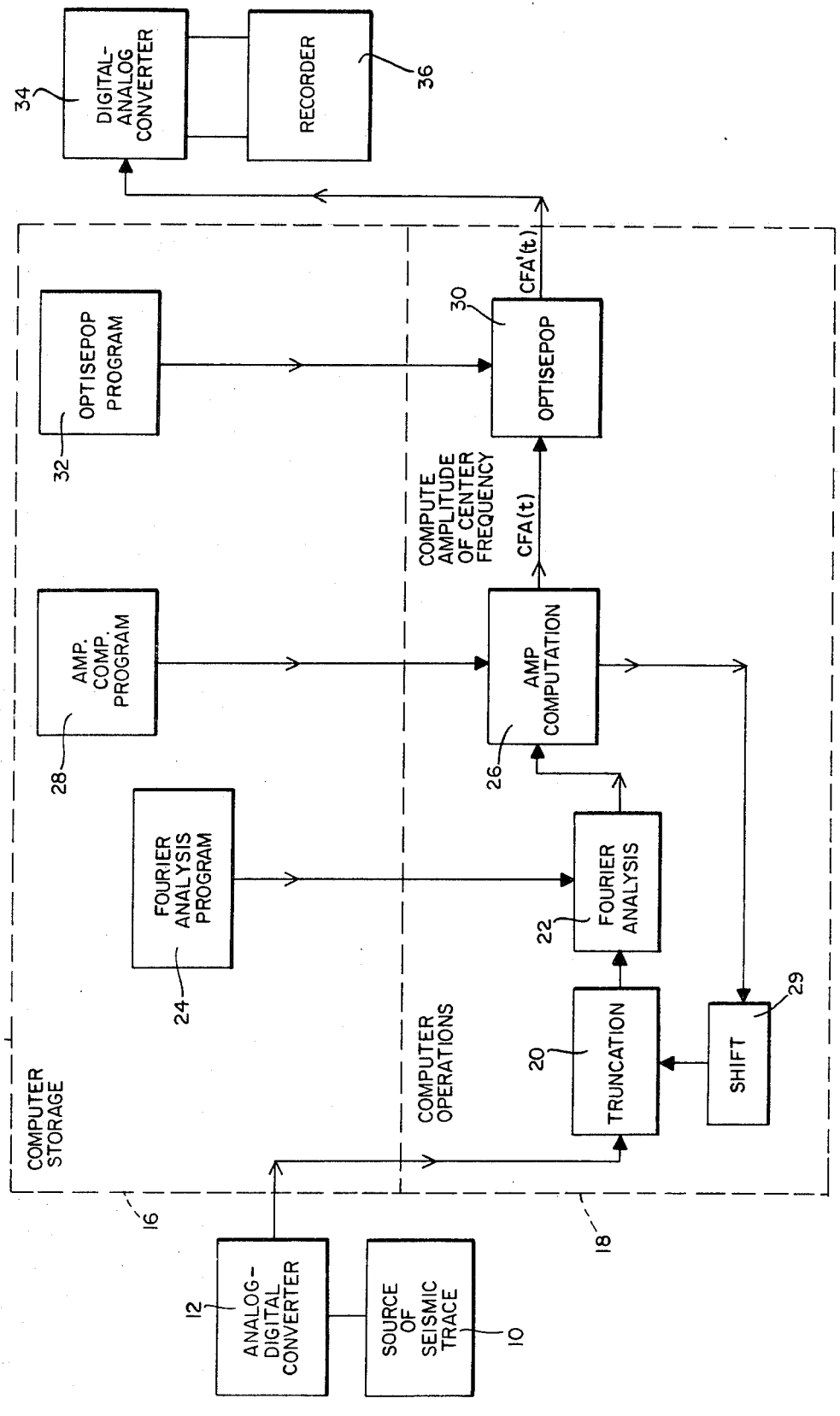
FIG. 2 is a schematic representation of an apparatus for and method of treating seismic data.

Referring now to FIG. 2, an analog representation of the seismic trace $S(t)$ is obtained from a source 10. In order to obtain a digital representation suitable as an input to a digital computing apparatus, the analog representation of the seismic trace $S(t)$ is applied to an analog-to-digital converter 12. The output of the converter 12 is then applied as an input to an automatic digital computer 14.

Initially, the digital representation of the trace $S(t)$ is applied to a storage section 16 of the computer 14. At an appropriate time, the digital representation of the seismic trace $S(t)$ is applied to an operations section 18. In general, the operations section 18 performs various operations on the physical representations of the input, in effect treating the seismic data of the seismic trace $S(t)$ in accordance with various programs stored in the storage section 16.

The first series of operations in the operations section 18 is directed to obtaining the function $|A_i^2|$ from the seismic trace $S(t)$. The truncation of the seismic trace $S(t)$ to produce a window along the horizontal time axis of FIG. 1a is performed by a truncation means 20. As an example, the window may be an interval approximately 0.1 seconds long along the seismic trace. The truncation of the seismic trace $S(t)$ is the Fourier analyzed by a Fourier analysis means 22 under the control of a Fourier analysis program 24 in the storage section 16 to obtain the function $|A_i^2|$.

Subsequently, the amplitude of the center frequency components for each Fourier analysis is computed at a center frequency computation means 26 under the control of an amplitude computation program 28 in the storage section 16. The computation program 28 includes appropriate instructions to carry out the computation $$\frac{1}{n} \sum_{i=1}^{i=n} A(f_i)$$

which equals the mean amplitude from the spectrum of frequency components $f_i$ in a window of the trace where $A(f_i)$ represents the amplitude of each of the n frequency components $f_i$. By repeating each of the operations in this first series over different intervals or windows along the time axis of FIG. 1a under the control of a window shift means 29, the mean spectral amplitude for successive Fourier analyses of successive truncations of the seismic trace may be obtained. When all of the mean spectral amplitudes are combined, the function obtained at the output of the amplitude computation means 26 is the function $CFA(t)$.

In order to remove the effects of the truncation and produce a wide band representation of the seismic trace, the process disclosed in U.S. Pat. No. 3,275,980 — Foster is applied to the function $CFA(t)$. The process has been denoted OPTISEPOP which is an anacronym for optimum separation operator. The OPTISEPOP process 30 operates under the control of an OPTISEPOP program 32. After a digital-to-analog conversion provided by a converter 34, the function $CFA'(t)$ as shown in FIG. 1c is recorded at a recorder 36.

The invention has been described in mathematical terms with repeated references made to data and functions. However, the data and functions are actually physical representations such as the state of a flip-flop or the magnitude of an electrical signal. Accordingly, the method and apparatus described operate on the physical representations of the data and functions and not on the data and functions as such.

While the method of the present invention can be practiced with the use of several well-known types of computing apparatus, the method is particularly suitable for use with a general purpose digital computer.

Digital computer programs for performing Fourier analysis are well known. Particularly good examples are described in the following: "Three Fortran Programs That Perform the Cooley-Tukey Fourier Transform", by N. M. Brenner, M. I. T. Lincoln Laboratory, Group 31, Technical Note 1967-2, 28 July 1967.

One particular computing system which is suitable for use is supplied by the Control Data Corporation under the general model designation, 6600, and includes the following components:

6404 Central Computer, 65K Memory
6638 Disc System
6602 Console Display
6681 Data Channel Converter
3228 Magnetic Tape Controller
607 Magnetic Tape Transport
3447 Card Reader Controller
405 Card Reader
3256 Line Printer Controller
501 Line Printer

What is claimed is:

1. An automatic computer performed method for obtaining a wide band representation from a seismic trace comprising the following steps:

generating a physical representation within the computer representing the trace of seismic reflections;

generating a physical representation within the computer representing successive truncations of the seismic trace corresponding to various windows of the trace;

generating a physical representation within the computer representing successive Fourier analyses of the successive truncations; and generating a physical representation within the computer representing the amplitude of the center frequency components of successive Fourier analyses as a function of time.

2. The computer performed method of claim 1 wherein the physical representation representing the amplitude of the center frequency components corresponds to the mean spectral amplitude of the windowed seismic trace for each point in time.

3. The computer performed method of claim 2 including the step of removing the effects of truncation from said function representing the amplitude of the center frequency components.

4. The computer performed method of claim 3 wherein the step of generating the physical representation within the computer representing the amplitude of the center frequency components includes the step of generating a physical representation within the computer representing summing the amplitude of all frequency components of each of the Fourier analyses to obtain the mean spectral amplitude of each of the Fourier analyses of the windowed seismic trace.

5. An automatic computing apparatus for treating data of the seismic trace comprising:

means for successively truncating the reflection energy function represented by the seismic trace;

means for successively Fourier analyzing the successive truncations;

means for successively computing the amplitude of the center frequency components of the respective Fourier analyses; and means for generating a center frequency amplitude function corresponding to the amplitude of the center frequency components.

6. The computing apparatus of claim 5 wherein said means for computing the amplitude includes means for successively computing the mean spectral amplitude of the windowed seismic trace for successive points in time.

7. The computing apparatus of claim 5 including means for removing the effects of truncation from said amplitude function.

* * * * *